US006942277B2

(12) United States Patent
Rangnekar et al.

(10) Patent No.: US 6,942,277 B2
(45) Date of Patent: Sep. 13, 2005

(54) VEHICLE DOOR HINGE ASSEMBLY

(75) Inventors: Nandkumar Rangnekar, Sterling Heights, MI (US); William Bowes, Macomb, MI (US); Gary Nylander, Hartland, MI (US); William Spencer Evans, Farmington Hills, MI (US); Takehito Ichino, Novi, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 0 days.

(21) Appl. No.: 10/740,925

(22) Filed: Dec. 22, 2003

(65) Prior Publication Data

US 2005/0134084 A1 Jun. 23, 2005

(51) Int. Cl.[7] .................................................. B60J 5/00
(52) U.S. Cl. .............................. 296/146.11; 296/146.9; 16/366
(58) Field of Search ...................... 296/146.11, 146.12, 296/146.9; 16/366, 302, 308, 287

(56) References Cited

U.S. PATENT DOCUMENTS

| | | | | |
|---|---|---|---|---|
| 1,253,641 | A * | 1/1918 | Steele | 16/222 |
| 2,138,523 | A * | 11/1938 | Haberstump | 296/146.11 |
| 2,810,153 | A * | 10/1957 | Semar | 16/308 |
| 4,713,862 | A | 12/1987 | Kinaga et al. | |
| 4,719,665 | A | 1/1988 | Bell | |
| 4,854,010 | A | 8/1989 | Maraghe et al. | |
| 5,561,887 | A | 10/1996 | Neag et al. | |
| 6,053,561 | A | 4/2000 | Hojnowski et al. | |
| 6,550,839 | B2 | 4/2003 | Rogers, Jr. et al. | |
| 6,550,845 | B1 | 4/2003 | Pietryga | |
| 6,629,337 | B2 | 10/2003 | Nania | |
| 6,718,596 | B2 * | 4/2004 | Kohlstrand et al. | 16/374 |
| 6,827,390 | B2 * | 12/2004 | Zummallen et al. | 296/146.11 |
| 2001/0013713 | A1 * | 8/2001 | Holt | 296/146.11 |
| 2002/0073507 | A1 | 6/2002 | Presley | |
| 2003/0097731 | A1 | 5/2003 | Nania | |
| 2003/0230910 | A1 * | 12/2003 | Azzouz et al. | 296/146.11 |

FOREIGN PATENT DOCUMENTS

| | | |
|---|---|---|
| DE | 1078901 B | 3/1960 |
| JP | 4-353183 A | 12/1992 |

* cited by examiner

*Primary Examiner*—Patricia L. Engle
(74) *Attorney, Agent, or Firm*—Shinjyu Global IP Counselors, LLP

(57) ABSTRACT

A door hinge assembly is mounted between a door mounting pillar of the vehicle body and a door to swingably mount the door to the door mounting pillar. The door hinge assembly includes an upper hinge and a lower hinge with a double pivot pin arrangement, and a torsion bar extending substantially vertically between the upper and lower hinges. The upper and lower hinges are fastened at interior fastening points on an inner side wall of the door mounting pillar and at exterior fastening points on an exterior wall portion of the door mounting pillar with longitudinal fastening axes that extend in a substantially orthogonal direction to the inner side wall and the exterior wall portion of the door mounting pillar. The interior fastening points are disposed rearwardly of the torsion bar and the exterior fastening points are disposed forwardly of the torsion bar.

23 Claims, 15 Drawing Sheets

VEHICLE DOOR HINGE ASSEMBLY

BACKGROUND OF THE INVENTION

1. Field of the Invention

The present invention generally relates to a vehicle body structure having a vehicle door hinge assembly. More specifically, the present invention relates to a vehicle door hinge assembly that pivotally mounts a door to a door mounting pillar of a vehicle body structure about a vertically arranged pivot axis.

2. Background Information

Vehicle doors are pivotally coupled to a vehicle body in a variety of ways. Many vehicle doors only open 90° or less. However, some doors are designed to open more than 90° by using a goose neck hinge arm. When a goose neck hinge arm is provided with a double pivot arrangement, the door can be selectively opened to different angles. Those double pivot hinges are generally used for cargo doors of van type vehicles to move the cargo door from a closed position to generally wide open positions. For example, U.S. Pat. No. 5,561,887 discloses a vehicle double pivot door hinge arrangement including a U-shaped link that is pivotally coupled to a door hinges and a body hinges about pivot axes. The body hinge first allows the door to pivot from the closed position to a 90° degree intermediate open position about the pivot axis of the body hinge. Then, the door hinge allows the door to pivot from the intermediate open position to a 180° degree full open position about the pivot axis of the door hinge. The body hinge includes a hinge leaf provided with three bolt holes disposed forwardly of the pivot axis of the door hinge to be mounted on a longitudinal pillar wall of the vehicle body.

In view of the above, it will be apparent to those skilled in the art from this disclosure that there exists a need for an improved vehicle body structure. This invention addresses this need in the art as well as other needs, which will become apparent to those skilled in the art from this disclosure.

SUMMARY OF THE INVENTION

It has been discovered that it is difficult to mount a door using a double pivot door hinge such as the one discussed above, since the fasteners or bolts connected to the vehicle body extend in the longitudinal direction. In other words, the heads of the bolts are located inside the door mounting pillar of the vehicle body. Moreover, it has been discovered that when a double pivot door hinge such as the one discussed above is used in a door with a vertical pivot axis, the forces on the upper and lower hinges during opening of the door causes a tendency for the door to twist.

The present invention was developed in view of these problems. Thus, one object of the present invention is to provide a door that can be easily mounted to a vertically extending side pillar and that can effectively resist the bending or twisting forces occurring when the door is opened.

The foregoing objects can basically be attained by providing a vehicle body structure comprising a vehicle body, a door and a door hinge assembly. The vehicle body includes a vertically extending door mounting pillar with a vehicle interior facing side and a vehicle exterior facing side. The door mounting pillar has an inner side wall disposed on the vehicle interior facing side, an outer side wall disposed on the vehicle exterior facing side, a pair of connecting end walls extending between the inner and outer side walls to define a hollow interior space, and an exterior wall portion disposed adjacent one of the connecting end walls in an area outside of the hollow interior space. The door is swingably mounted to the door mounting pillar of the vehicle body to move between a closed position and an open position. The door hinge assembly is mounted between the door mounting pillar and the door to swingably mount the door to the door mounting pillar for movement between the closed position and the open position. The door hinge assembly is fastened at interior fastening points on the inner side wall of the door mounting pillar and at exterior fastening points on the exterior wall portion of the door mounting pillar.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
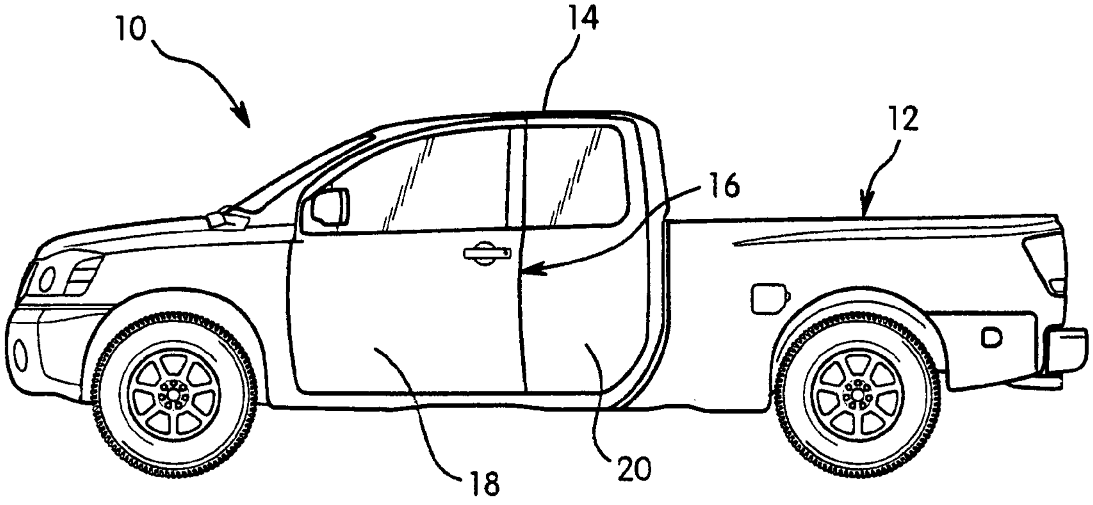
FIG. 1 is a driver's side elevational view of a vehicle having pivotally mounted rear doors in accordance with a preferred embodiment of the present invention.
Figure 2:
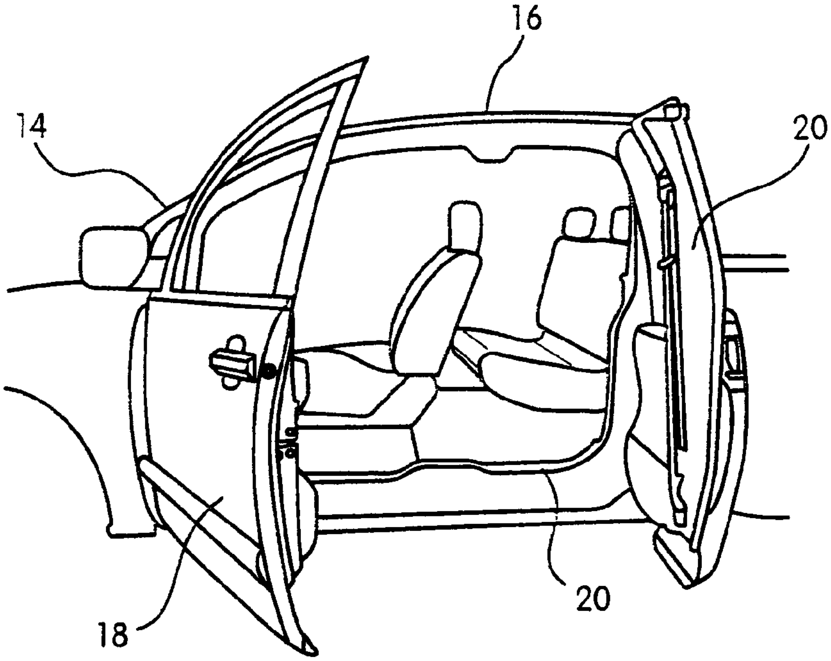
FIG. 2 is a passenger's side perspective view of the vehicle illustrated in FIG. 1 with the front and rear door pivoted to open positions in accordance the present invention.
Figure 3:
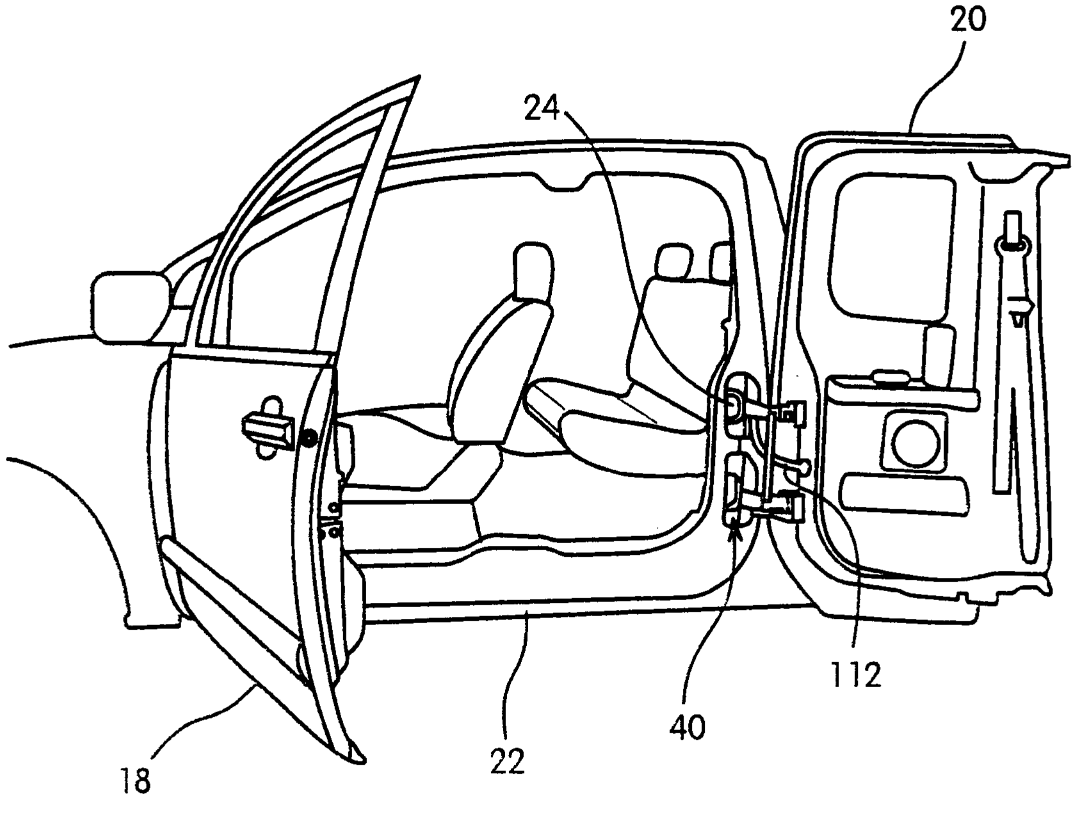
FIG. 3 is a passenger's side perspective view of the vehicle illustrated in FIGS. 1 and 2 with the rear door pivoted to a further open position from the open position illustrated in accordance the present invention.

Referring initially to FIGS. 1–3, a vehicle 10 is illustrated in accordance with the present invention. The vehicle 10 includes a frame mounted vehicle body 12 that is configured and arranged to be mounted to a chassis or frame (not shown). The vehicle 10 is illustrated as a pick-up truck. However, it will become apparent to those skilled in the art from the following detailed description that the present invention can be applied to other types of vehicles. Thus, the particular type of the vehicle 10 is not important. Thus, the vehicle 10 will not be discussed or illustrated in detail herein, except to the extent that the parts of the vehicle 10 relate to the present invention.

The vehicle body 12 has a vehicle cabin structure 14 with a pair of side body portions 16, a pair of front doors 18 and a pair of rear doors 20. The front doors 18 are pivotally coupled to a front portion of the side body portion 16, while the rear doors 20 are pivotally coupled to a rear portion of the side body portion 16 as discussed below. The right and left sides of the vehicle cabin structure 14 are essentially mirror images as to the structures that relate to present invention. Thus, only the passenger's side of the vehicle 10 will be discussed and/or illustrated in detail herein.

The side body portion 16 is preferably constructed of a plurality of metallic sheet materials that are configured and arranged to define the overall shape of a side of the cabin structure 14. Preferably, the side body portion 16 is configured and arranged to form an annular door ledge 22 for receiving and supporting the front and rear doors 18 and 20, when the front and rear doors 18 and 20 are in the closed position. Since the particular construction of the front door 18 and the associated vehicle body structures are conventional and well known in the art, the front door 18 and the associated vehicle body structures will not be discussed and/or illustrated in further detail herein. Rather, the following description of the vehicle will focus on the structure of the vehicle 10 that relates to the rear door 20.

Preferably, the side body portion 16 has a rear door mounting pillar 24 disposed at the rear end of the annular door ledge 22. The rear door mounting pillar 24 hingedly supports the rear door 20 for pivoting towards the rear of the vehicle 10 from a closed position to an opened position about a vertically arranged pivot axis as illustrated in FIGS. 2 and 3.

Figure 5:
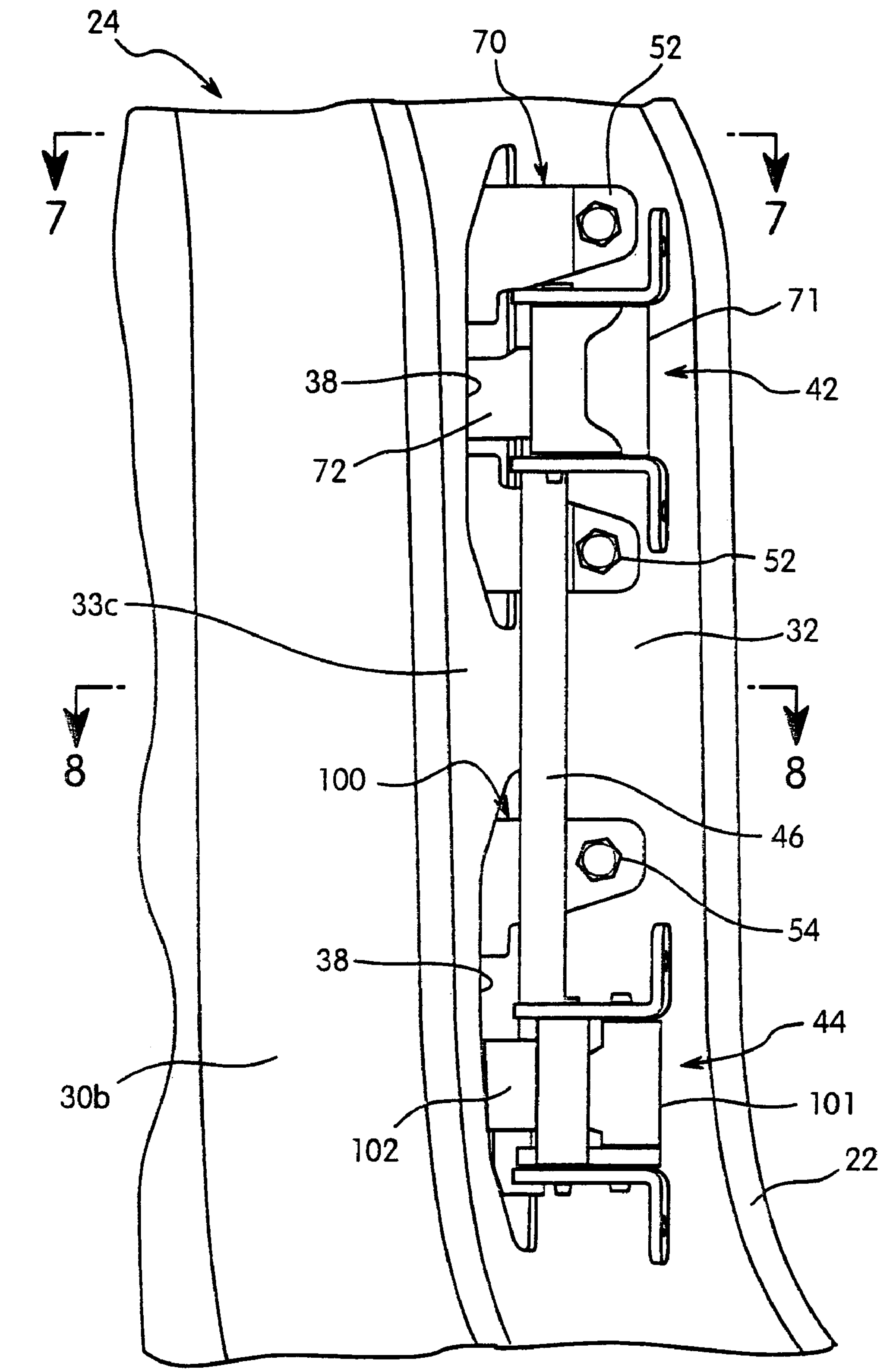
FIG. 5 is a partial exterior side elevational view of the passenger's side of the vehicle illustrated in FIGS. 1–4 with the rear door hinge assembly attached to the rear door pillar, but with the rear door removed.
Figure 6:
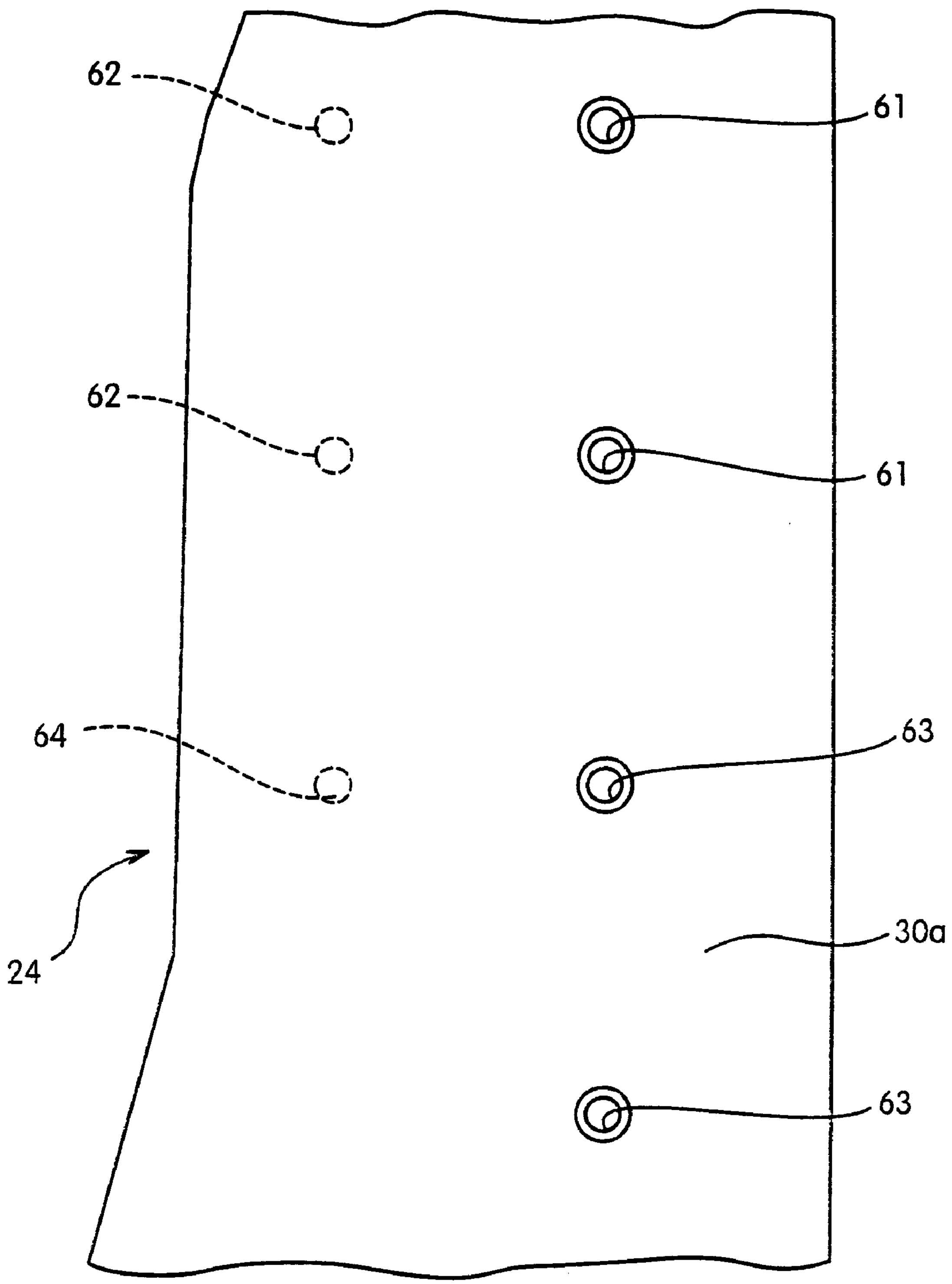
FIG. 6 is an partial interior side elevational view of the passenger's side of the vehicle illustrated in FIGS. 1–5 with the rear door removed.
Figure 7:
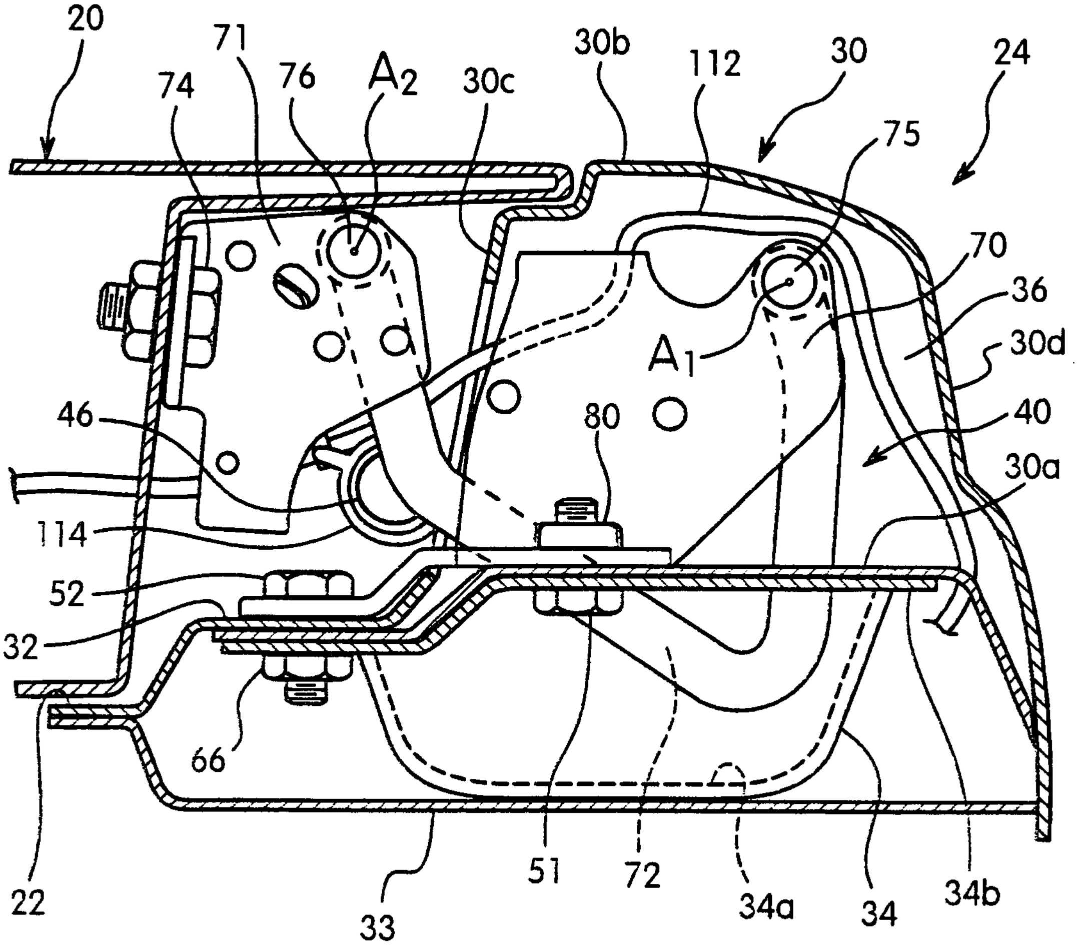
FIG. 7 is a transverse cross sectional view of the passenger's side rear door pillar with the rear door hinge assembly in the retracted position as view along section line 7—7 of FIG. 5.
Figure 8:
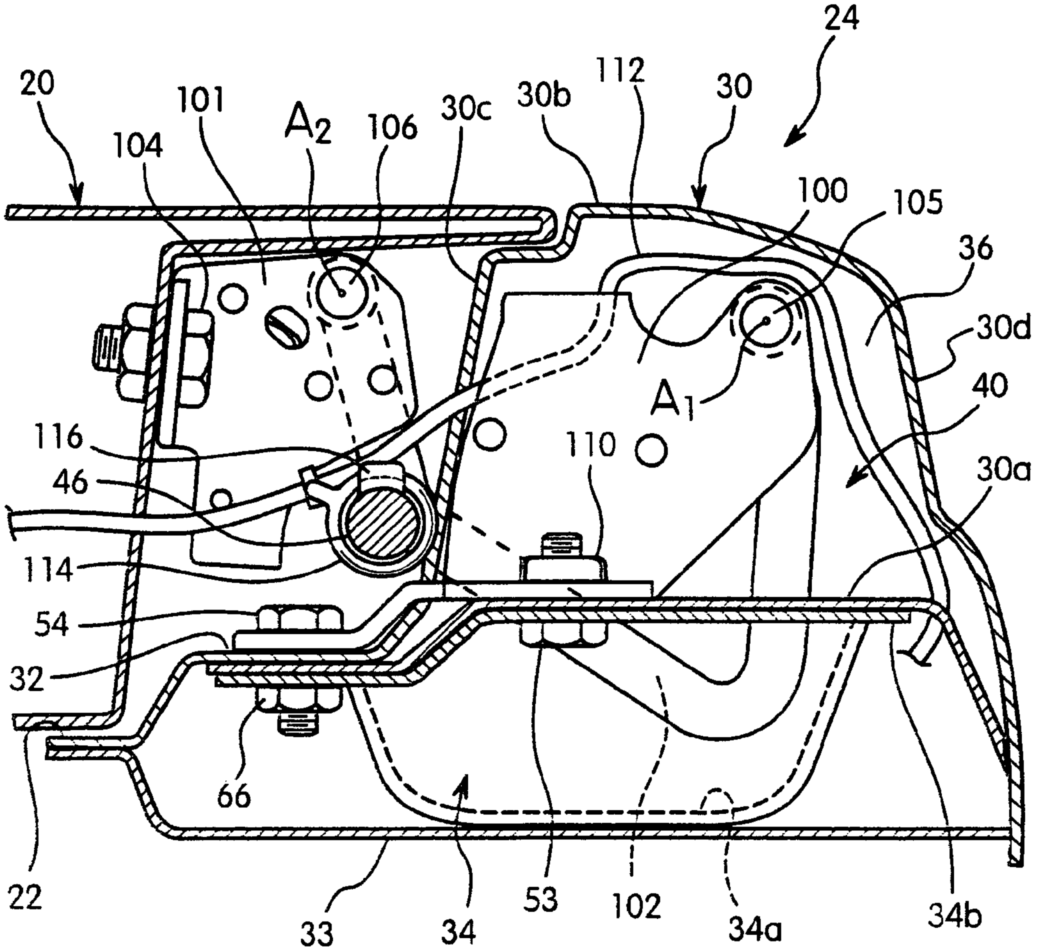
FIG. 8 is a transverse cross sectional view of the passenger's side rear door pillar with the rear door hinge assembly in the retracted position as viewed along section line 8—8 of FIG. 5.
Figure 9:
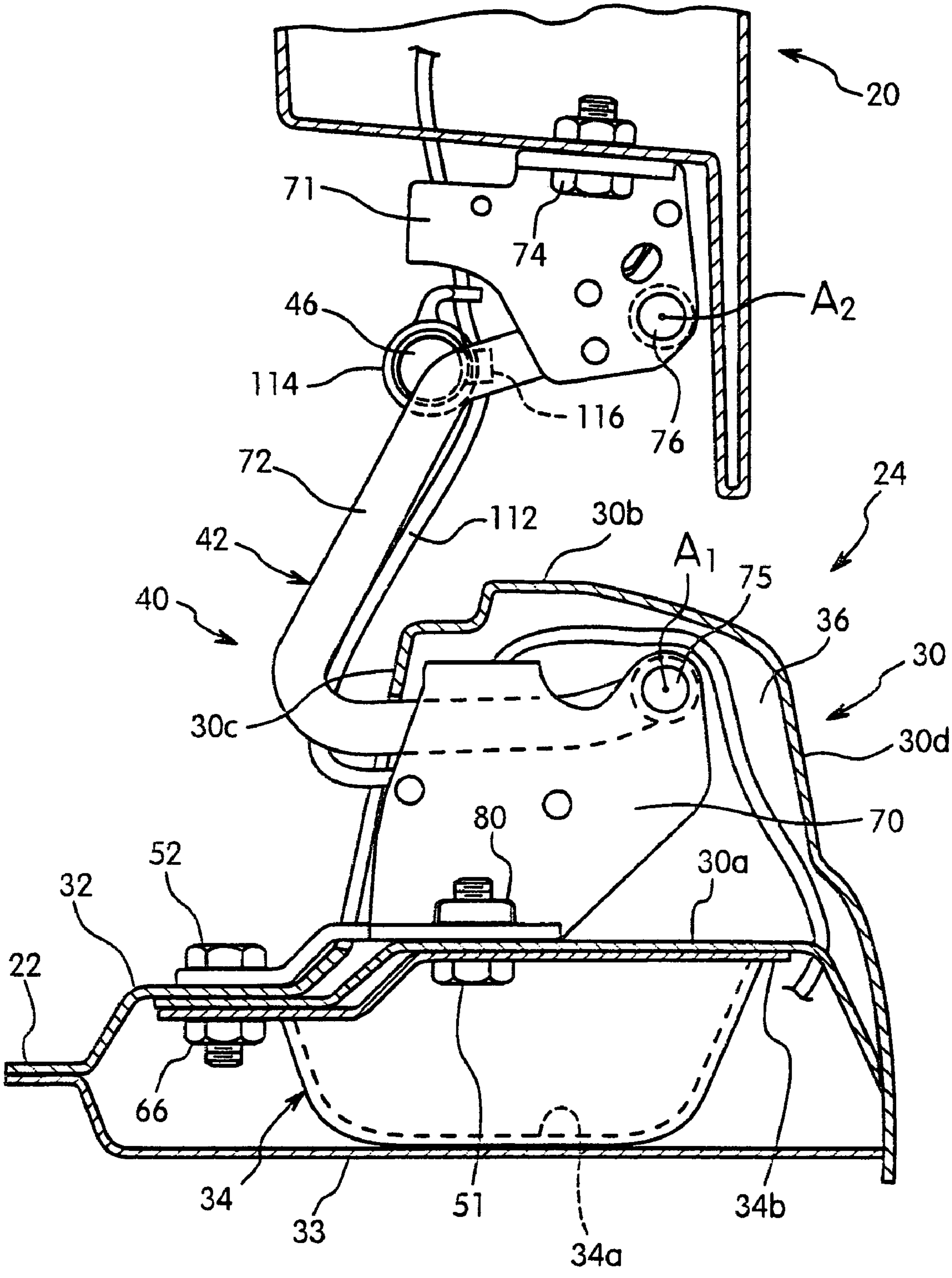
FIG. 9 is a transverse cross sectional view, similar to FIG. 7, of the passenger's side rear door pillar but with the rear door hinge assembly in a first open position in which the rear door is opened approximately 90 degrees from the closed position.
Figure 10:
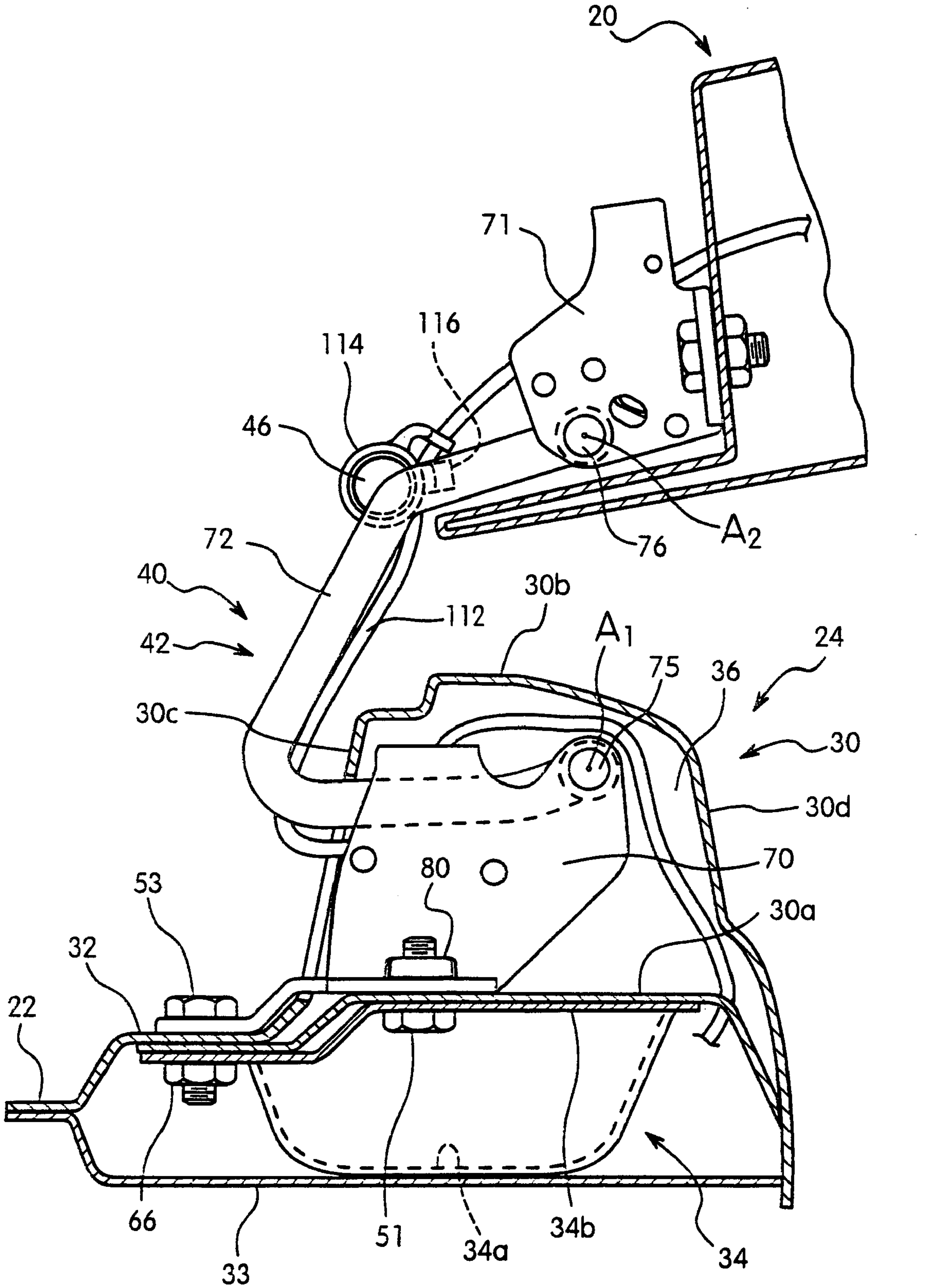
FIG. 10 is a transverse cross sectional view, similar to FIGS. 7 and 9, of the passenger's side rear door pillar but with the rear door hinge assembly in a second open position in which the rear door is opened approximately 170 degrees from the closed position.

Referring now to FIGS. 4–10, the rear door mounting pillar 24 is a vertically extending member that is integrated within the overall structure of the cabin structure 14. Basically, the rear door mounting pillar 24 is constructed of one or more sheet metal sections that are configured and arranged to form a tubular rigid support member having a substantially box shaped cross section that is integrated into the door ledge 22 of the cabin structure 14. In particular, the support structure of the rear door mounting pillar 24 is basically formed by a tubular portion 30 and an exterior wall portion 32 that forms part of the door ledge 22. Moreover, as seen in FIGS. 7 and 10, the tubular portion 30 preferably has a pair of cup shaped reinforcement members 34 for accommodating pivotal movement of the rear door 20 and for adding additional strength to the tubular portion 30 as explained below in further detail.

Preferably, the rear door mounting pillar 24 has a vehicle interior facing side that defines a portion of the interior of the cabin structure 14 and a vehicle exterior facing side that forms of portion of the exterior surface of the cabin structure 14. Typically, the vehicle interior facing side of the rear door mounting pillar 24 has a vehicle interior trim panel (not shown) secured thereto. Accordingly, the tubular portion 30 of the rear door mounting pillar 24 has an inner side wall **30*a*, an outer side wall 30*b* and a pair of connecting end walls 30*c* and 30*d* extending between the inner and outside walls 30*a* and 30*b* to define a hollow interior space 36 of the tubular portion 30. In the illustrated embodiment, the tubular portion 30 further includes an interior panel 33 overlying inner side wall 30*a* and the cup shaped reinforcement members 34**.

The inner side wall **30*a* is disposed on the vehicle interior facing side of the rear door mounting pillar 24, while the outside wall 30*b* is disposed on the vehicle exterior facing side of the rear door mounting pillar 24 and forms an exterior surface of the vehicle 10. The cup shaped reinforcement members 34 are fixedly coupled to the inner side wall 30*a* of the rear door mounting pillar 24 to accommodate the pivotal movement of the rear door 20 and to strengthen the tubular portion 30. The forwardly facing connecting end walls 30*c* has a pair of vertically spaced apart openings 38 for accommodating a rear door hinge assembly 40 that pivotally connects the rear door 20 to the inner side wall 30*a* and the exterior wall portion 32 of the rear door mounting pillar 24** as explained below.

The exterior wall portion 32 extends from the forwardly facing connecting end wall **30*c* and inwardly towards the interior of the vehicle 10 relative to the plane of the inner side wall 30*a*. The exterior wall portion 32 is configured and arranged to form an exterior mounting area for mounting the rear door hinge assembly 40 as explained below. Preferably, the exterior wall portion 32, the outer side wall 30*b*, the connecting end walls 30*c* and 30*d* are formed from a single continuous metal sheet that also forms the rear end of the door ledge 22 as seen in FIGS. 7–10**.

As seen in FIGS. 7–10, the rear door hinge assembly 40 pivotally connects the rear door 20 to the rear door mounting pillar 24. Thus, the rear door 20 is swingably mounted to the rear door mounting pillar 24 of the vehicle side body portion 16 to move between a closed position and an open position. In the closed position, the rear door 20 is disposed within the door ledge 22 of the side body portion 16. Preferably, the door hinge assembly 40 has a double pivot pin arrangement that is configured and arranged such that the rear door 20 swings to an opened position that is substantially 170 degrees from the closed position as seen in FIG. 10. More preferably, the door hinge assembly 40 is configured and arranged such that the rear door 20 is swingably mounted to the door mounting pillar 24 for movement between the closed position to a first open position in which the door pivots approximately 90 degrees relative to the closed position about a first vertical pivot axis A1 as seen in FIG. 9. After reaching the first open position, the door hinge assembly 40 is configured such that the rear door 20 then pivots about a second vertical pivot axis A2 such that the rear door 20 opens to approximately 170 degrees relative to the closed position as seen in FIG. 10. In the illustrated embodiment, the rear door 20 preferably pivots 168 degrees when the rear door 20 is pivoted from the closed position to the fully opened position or the second open position.

In the illustrated embodiment, as seen in FIGS. 11–16, the door hinge assembly 40 basically includes an upper hinge 42, a lower hinge 44, and a torsion bar 46 that interconnects the upper and lower hinges 42 and 44 together. The door hinge assembly 40 also preferably includes a coiled tension spring 48 coupled to the lower hinge 44 and a latch mechanism 50 coupled to the lower hinge 44. The coiled tension spring 48 applies an urging force that biases the rear door 20 to a closed position until the door is opened a predetermined amount, while the latch mechanism 50 overrideably retains the rear door 20 in the first open position (90°) until a predetermined pivoting force is applied to the door hinge assembly 40 that overcomes a latching force of the latch mechanism 50, as explained below. Thus, the latch mechanism 50 is configured and arranged to stop the rear door 20 in the first open position (90°) so that the rear door 20 does not readily pivot about the second pivot axis A2. Rather, an additional pivoting force needs to be applied to the rear door 20 to cause the latch mechanism 50 to release the lower hinge 44 so that the rear door 20 can freely pivot about the second pivot axis A2.

The door hinge assembly 40 is a hidden hinge that is not visible when the rear door 20 is in the closed position. Thus, in the illustrated embodiment, the door hinge assembly 40 is configured and arranged such that a majority of the upper and lower hinges 42 and 44 are disposed within the hollow interior space 36 of the door mounting pillar 24 when in the rear door 20 is in the closed position, and a majority of the upper and lower hinges 42 and 44 are disposed outside of the hollow interior space 36 of the door mounting pillar 24 when in the rear door 20 is in the fully opened position.

As seen in FIG. 5, the upper and lower hinges 42 and 44 are fixedly mounted to the rear door 20 and the door mounting pillar 24 at vertically spaced apart locations. In particular, first portions of the upper and lower hinges 42 and 44 are fixedly mounted within the hollow interior space 36 of the door mounting pillar 24 and second portions of the upper and lower hinges 42 and 44 are fixedly mounted outside of the hollow interior space 36 of the door mounting pillar 24. More specifically, two upper interior fasteners or bolts 51 are used to fixedly mount the upper hinge 42 to the inner side wall 30*a* of the tubular portion 30 of the door mounting pillar 24, while two upper exterior fasteners or bolts 52 are used to fixedly mount the upper hinge 42 to the exterior wall portion 32 of the door mounting pillar 24. Similarly, two lower interior fasteners or bolts 53 are used to fixedly mount the lower hinge 44 to the inner side wall 30*a* of the tubular portion 30 of the door mounting pillar 24, while a single lower exterior fastener or bolt 54 is used to fixedly mount the lower hinge 44 to the exterior wall portion 32 of the door mounting pillar 24. The fasteners or bolts 51–54 have longitudinal fastening axes that all extend in the same direction, i.e. an interior to exterior direction of the vehicle 10. This arrangement allows for easier installation of the door hinge assembly 40 to the door mounting pillar 24.

To accommodate this mounting arrangement, the rear door mounting pillar 24 has a plurality of fastening points (four interior and three exterior fastening points) arranged on the interior facing side of the rear door mounting pillar 24. Specifically, the inner side wall 30*a* of the tubular portion 30 of the rear door mounting pillar 24 preferably has two upper interior fastening points or holes 61 that are vertically spaced apart to receive the upper interior bolts 51 to fixedly mount the upper hinge 42 within the hollow interior space 36 of the door mounting pillar 24. Similarly, the exterior wall portion 32 of the door mounting pillar 24 preferably has two upper exterior fastening points or holes 62 that are vertically spaced apart to receive the upper exterior bolts 52 to fixedly mount the upper hinge 42 to the exterior wall portion 32 of the door mounting pillar 24. The inner side wall 30*a* of the tubular portion 30 of the rear door mounting pillar 24 preferably further includes two lower interior fastening points or holes 63 that are vertically spaced apart to receive the lower interior bolts 53 to fixedly mount the lower hinge 44 within the hollow interior space 36 of the door mounting pillar 24. The exterior wall portion 32 of the door mounting pillar 24 preferably further includes a single lower exterior fastening point or hole 64 that receives the lower exterior bolt 54 to fixedly mount the lower hinge 44 to the exterior wall portion 32 of the door mounting pillar 24.

Figure 4:
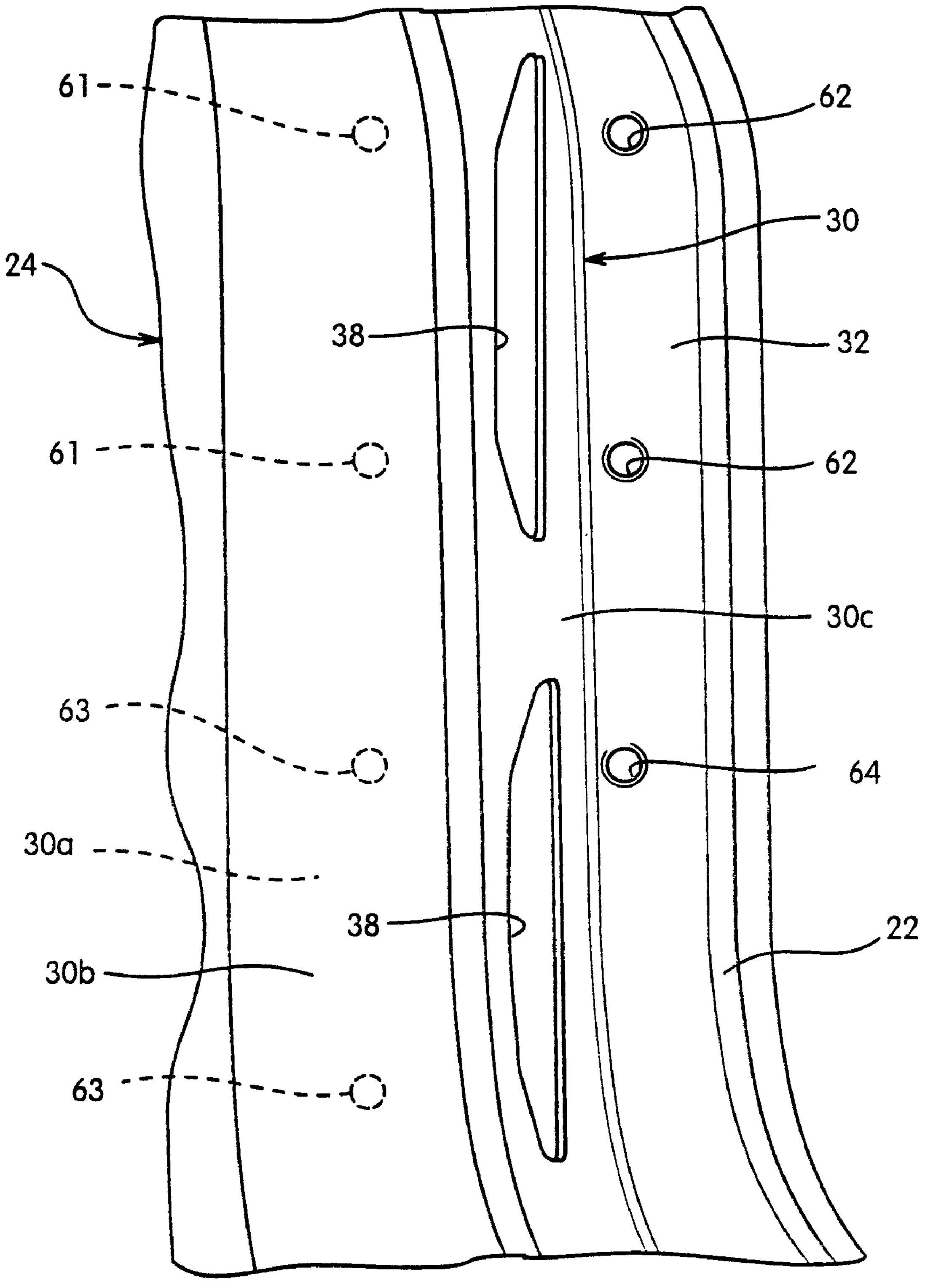
FIG. 4 is a partial exterior side elevational view of the passenger's side of the vehicle illustrated in FIGS. 1–3 with the rear door and the rear door hinge assembly removed to illustrate the rear door pillar.

Preferably, as seen in FIGS. 4–6, the interior fastening holes 61 and 63 are vertically aligned and lie substantially in a single vertical plane of the inner wall 30*a* of the door mounting pillar 24. Similarly, the exterior fastening holes 62 and 64 are vertically aligned and lie substantially in a single vertical plane of the exterior wall portion 32 of the door mounting pillar 24. However, the vertical plane of the exterior wall portion 32 containing the exterior fastening holes 62 and 64 is preferably offset towards the vehicle interior from the vertical plane of the inner wall 30*a* containing the interior fastening holes 61 and 63. Accordingly, the vertical plane of the exterior wall portion 32 containing the exterior fastening holes 62 and 64 is located closer to the center longitudinal plane of the vehicle 10 then a vertical plane of the inner wall 30*a* containing the interior fastening holes 61 and 63.

As will become more apparent from the description of the door hinge assembly 40, the present invention allows for easy installation of the door hinge assembly 40 without adversely affecting the appearance or structural integrity of the vehicle 10. For example, access openings for accessing the bolts 51–54 are minimized if not completely elimination in the preferred design.

In the illustrated embodiment, the interior bolts 51 and 53 are threaded into the inner wall 30*a* of the door mounting pillar 24, while the exterior bolts 52 and 54 are threaded into the exterior wall portion 32 of the rear door mounting pillar 24. Accordingly, the interior bolts 51 and 53 are installed by inserting the interior bolts 51 and 53 from the vehicle interior side of the vehicle 10 through the interior fastening holes 61 and 63, which are unthreaded holes, and threading the interior bolts 51 and 53 into the door hinge assembly 40. The exterior bolts 52 and 54, on the other hand, are installed in the opposite direction from the interior bolts 51 and 53. In particular, the exterior bolts 52 and 54 are installed by inserting the exterior bolts 52 and 54 from the vehicle exterior side of the vehicle 10 through the exterior fastening holes 62 and 64, which are unthreaded holes, and threading the exterior bolts 52 and 54 into nuts 66 located on the vehicle interior side of the exterior wall portion 32 of the rear door mounting pillar 24. Thus, while the bolts 51–54 are all substantially parallel and extending a side to side direction of the vehicle 10, the exterior bolts 52 and 54 are installed in the opposite direction from the interior bolts 51 and 53.

As seen in FIGS. 7 and 9–12, the upper hinge 42 basically includes an upper pillar mounting member 70, an upper door mounting member 71 and an upper goose-neck connecting member 72 extending between the upper pillar mounting member 70 and the upper door mounting member 71. The upper pillar mounting member 70 is fixedly coupled to the rear door mounting pillar by the upper fasteners or bolts 51 and 52. The upper door mounting member 71 is fixedly coupled to the door by a pair of door mounting fasteners or bolts 74. The upper goose-neck connecting member 72 is pivotally coupled at a first end to the upper pillar mounting member 70 by a first pivot pin 75 that lies on the first vertical pivot axis A1 of the door hinge assembly 40. The second end of the upper goose-neck connecting member 72 is pivotally connected to the upper door mounting member 71 by a second pivot pin 76 that is arranged on the second pivot axis A2 of the door hinge assembly 40.

The upper pillar mounting member 70 is preferably a one piece unitary member constructed out of a rigid metallic material. In particular, the upper pillar mounting member 70 has a pair of mounting flanges 78 connected together by a U-shaped central portion 79. Each of the mounting flanges 78 has an interior mounting portion **78*a* with an interior mounting hole 78*a*' and an exterior mounting portion 78*b* with an exterior mounting hole 78*b*'. Preferably, the interior mounting portions 78*a* of the mounting flanges 78 lie in a first plane and the exterior mounting portions 78*b* of the mounting flanges 78 lie in a second plane that is parallel to the first plane of the interior mounting portions 78*a*. Basically, the upper pillar mounting member 70 is located substantially completely within the hollow interior space 36 of the door mounting pillar 24, except for the exterior mounting portions 78*b* of the mounting flanges 78 that extend outwardly through the upper opening 38 of the forward facing connecting end wall 30*c* of the rear door mounting pillar 24**.

The interior mounting portions **78*a* of the mounting flanges 78 has mounting nuts 80 fixedly coupled thereto that are axially aligned with the interior mounting holes 78*a*' of the mounting flanges 78. Accordingly, the upper pillar mounting member 70 is secured within the rear door mounting pillar 24 by the bolts 51 that extend through the holes 61 in the inner side wall 30*a* of the door mounting pillar 24 and are threaded into the mounting nuts 80 secured to exterior sides of the interior mounting portions 78*a* of the mounting flanges 78. This arrangement provides easy attachment of the upper pillar mounting member 70 within the hollow interior space 36 of the rear door mounting pillar 24**.

The exterior mounting portions **78*b* of the upper pillar mounting member 70, on the other hand, are fastened by the bolts 52 that are threaded into the nuts 66 that are located on the vehicle interior side of the exterior wall portion 32 of the rear door mounting pillar 24. Thus, when the upper hinge 42 is mounted to the rear door mounting pillar 24 by the bolts 51 and 52, the longitudinal fastening axes of the bolts 51 and 52 extend in a substantially orthogonal direction relative to the vehicle interior. In other words, in the case of a side door, the longitudinal fastening axis of the bolts 51 and 52 are arranged substantially perpendicular to the longitudinal center axis of the side body portion 16. This arrangement also allows the bolts 51 to be attached from the interior of the vehicle and the bolts 52 to be attached from the exterior of the vehicle. In other words, the bolts 51 are mounted to the rear door mounting pillar 24 such that the heads of the bolts 51 are located on the interior side of the inner side wall 30*a* of the rear door mounting pillar 24, while the heads of the bolts 52 are located on the exterior side of the exterior wall portion 32 of the rear door mounting pillar 24**.

The U-shaped central portion 79 of the upper pillar mounting member 70 has a pair of axially aligned holes that support the first pivot pin 75 of the first end of the upper goose-neck connecting member 72. Thus, the upper goose-neck connecting member 72 is located in the area between the pair of mounting flanges 78. Further, the upper goose-neck connecting member 72 is configured and arranged to pivot relative to the upper pillar mounting member 70 about the first vertical pivot axis A1 of the door hinge assembly 40. The second end of the upper goose-neck connecting member 72 is pivotally connected to the upper door mounting member 71 by the second pivot pin 76 that is arranged on the second pivot axis A2 of the door hinge assembly 40. The upper door mounting member 71 is preferably constructed as a one piece unitary member constructed of a rigid metallic material.

The upper goose-neck connecting member 72 is preferably constructed of a one piece, unitary member that has a pair of tubular end portions for pivotally receiving the pivot pins 75 and 76 therein. The upper goose-neck connecting member 72 has the upper end of the torsion bar 46 fixedly coupled thereto at a point between the pivot pins 75 and 76. Preferably, the torsion bar 46 fixedly coupled to the upper goose-neck connecting member 72 at a point such that the vertical axis of the torsion bar 46 always remains between an interior fastener mounting plane that contains the longitudinal axes of the interior bolts 51 and an exterior plane that contains the longitudinal axes of the exterior bolts 52. In other words, the interior fastening points of the upper hinge 42 are disposed rearwardly of the torsion bar 46 and the exterior fastening points of the upper hinge 42 are disposed forwardly of the torsion bar 46 in the open and closed positions.

As seen in FIGS. 8, 11–12 and 16, the lower hinge 44 basically includes a lower pillar mounting member 100, a lower door mounting member 101, and a lower goose-neck connecting member 102. Basically, the lower hinge 44 is identical to the upper hinge 42, except that the lower pillar mounting member 100 has been slightly modified to have only three mounting points instead of four mounting points as in the upper pillar mounting member 70 and the latch mechanism 50 is coupled to the lower pillar mounting member 101.

The lower pillar mounting member 100 is fixedly coupled to the rear door mounting pillar 24 by the lower fasteners or bolts 53 and 54. The lower door mounting member 101 is fixedly coupled to the door by a pair of door mounting fasteners or bolts 104. The lower goose-neck connecting member 102 is pivotally coupled at a first end to the lower pillar mounting member 100 by a first pivot pin 105 that lies on the first vertical pivot axis A1 of the door hinge assembly 40. The second end of the lower goose-neck connecting member 102 is pivotally connected to the lower door mounting member 101 by a second pivot pin 106 that is arranged on the second pivot axis A2 of the door hinge assembly 40.

The lower pillar mounting member 100 is preferably a one piece unitary member constructed out of a rigid metallic material. In particular, the lower pillar mounting member 100 has a pair of mounting flanges 108 connected together by a U shaped central portion 109. Each of the mounting flanges 108 has an interior mounting portion **108*a* with an interior mounting hole 108*a*' and an exterior mounting portion 108*b* with an exterior mounting hole 108*b*'. Preferably, the interior mounting portions 108*a* of the mounting flanges 108 lie in a first plane and the exterior mounting portion 108*b* of the mounting flanges 108 lies in a second plane that is parallel to the first plane of the interior mounting portions 108***a*. Basically, the lower pillar mounting member 100 is located substantially completely within the hollow interior space 36 of the rear door mounting pillar 24, except for the exterior mounting portion 108*b* of the mounting flange 108 that extends outwardly through the lower opening 38 of the forward facing connecting end wall 30*c* of the rear door mounting pillar 24.

The interior mounting portions 108*a* of the mounting flanges 108 has mounting nuts 110 fixedly coupled thereto that are axially aligned with the interior mounting holes 108*a*' of the mounting flanges 108. Accordingly, the lower pillar mounting member 100 is secured within the rear door mounting pillar 24 by the bolts 53 that extend through the holes 62 in the inner side wall 30*a* of the door mounting pillar 24 and are threaded into the mounting nuts 110 secured to exterior sides of the interior mounting portions 108*a* of the mounting flanges 108. This arrangement provides easy attachment of the lower pillar mounting member 100 within the hollow interior space 36 of the rear door mounting pillar 24.

The exterior mounting portion 108*b* of the lower pillar mounting member 100, on the other hand, is fastened by the bolt 54 that is threaded into the nut 66 that is located on the vehicle interior side of the exterior wall portion 32 of the rear door mounting pillar 24. Thus, when the lower hinge 44 is mounted to the rear door mounting pillar 24 by the bolts 53 and 54, the longitudinal fastening axes of the bolts 53 and 54 extend in a substantially orthogonal direction relative to the vehicle interior. In other words, in the case of a side door, the longitudinal fastening axis of the bolts 53 and 54 are arranged substantially perpendicular to the longitudinal center axis of the side body portion 16. This arrangement also allows the bolts 53 to be attached from the interior of the vehicle and the bolt 54 to be attached from the exterior of the vehicle. In other words, the bolts 53 are mounted to the rear door mounting pillar 24 such that the heads of the bolts 53 are located on the interior side of the inner side wall 30*a* of the rear door mounting pillar 24, while the head of the bolt 54 is located on the exterior side of the exterior wall portion 32 of the rear door mounting pillar 24.

The U shaped central portion 109 of the lower pillar mounting member 100 has a pair of axially aligned holes that support the first pivot pin 105 of the first end of the lower goose-neck connecting member 102. Thus, the lower goose-neck connecting member 102 is located in the area between the pair of mounting flanges 108. Further, the lower goose-neck connecting member 102 is configured and arranged to pivot relative to the lower pillar mounting member 100 about the first vertical pivot axis A1 of the door hinge assembly 40. The second end of the lower goose-neck connecting member 102 is pivotally connected to the lower door mounting member 101 by the second pivot pin 106 that is arranged on the second pivot axis A2 of the door hinge assembly 40. The lower door mounting member 101 is preferably constructed as a one piece unitary member constructed of a rigid metallic material.

Figure 11:
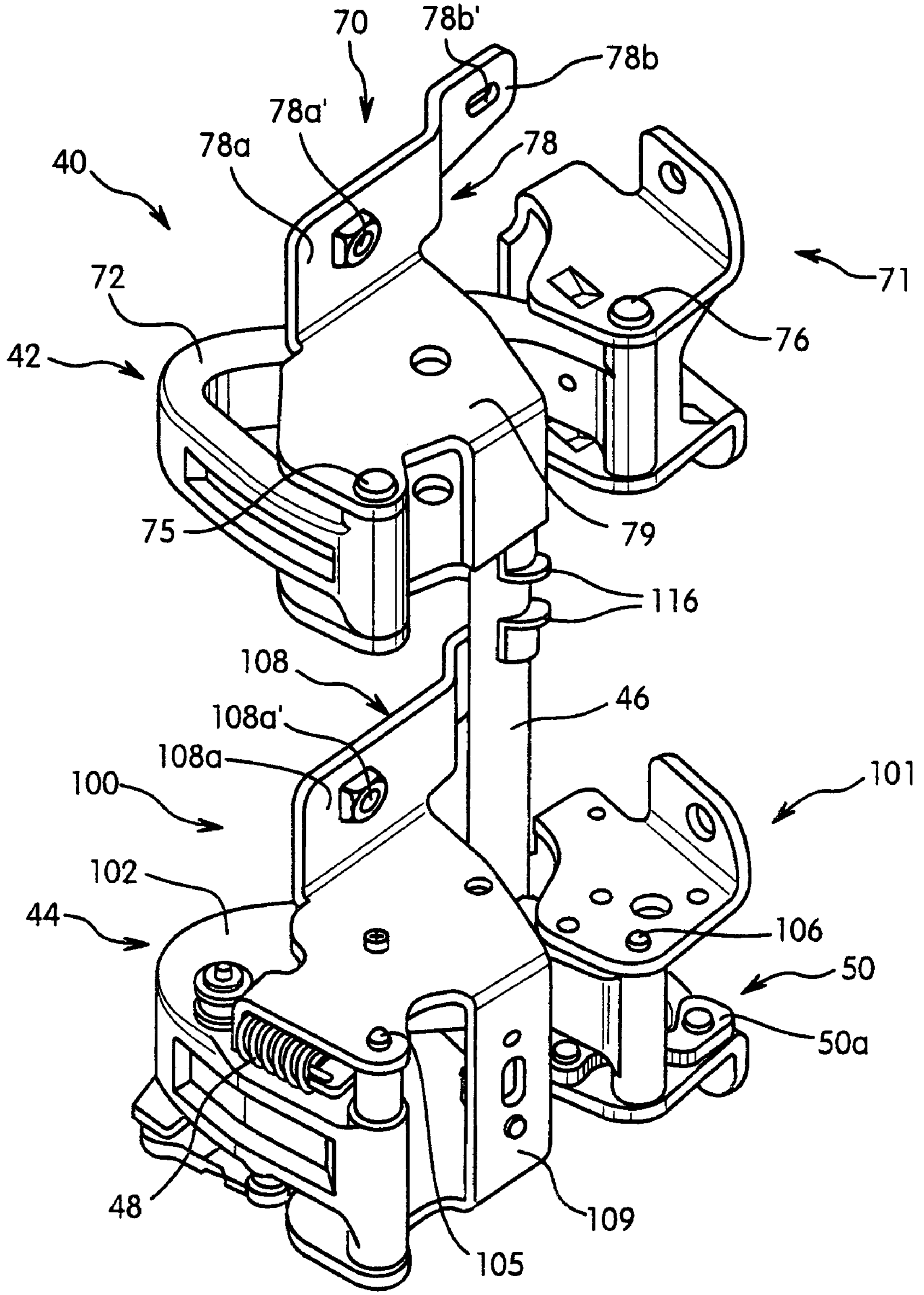
FIG. 11 is an exterior side perspective view of the rear door hinge assembly for the passenger's side rear door.
Figure 12:
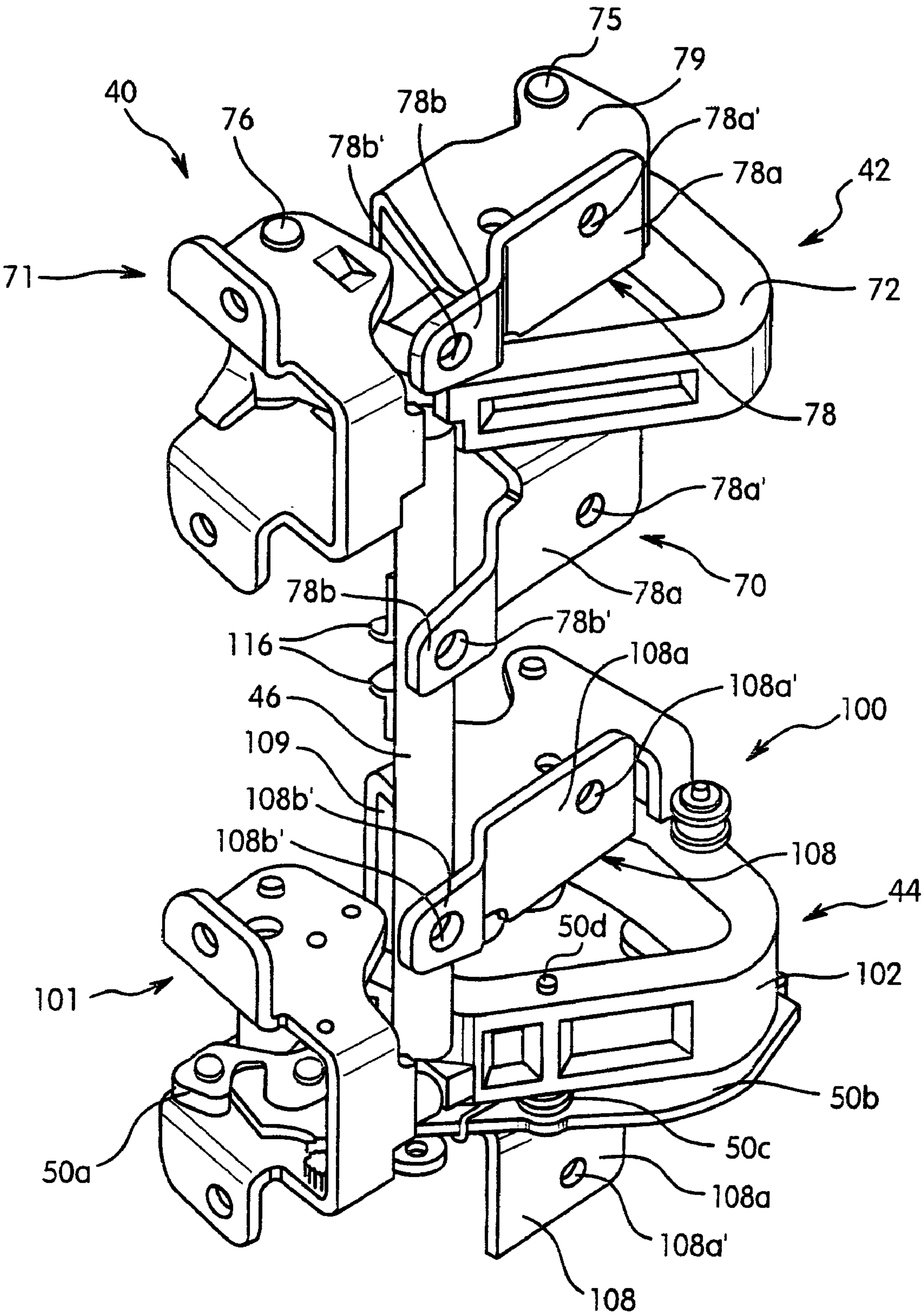
FIG. 12 is an interior side perspective view of the rear door hinge assembly for the passenger's side rear door.
Figure 13:
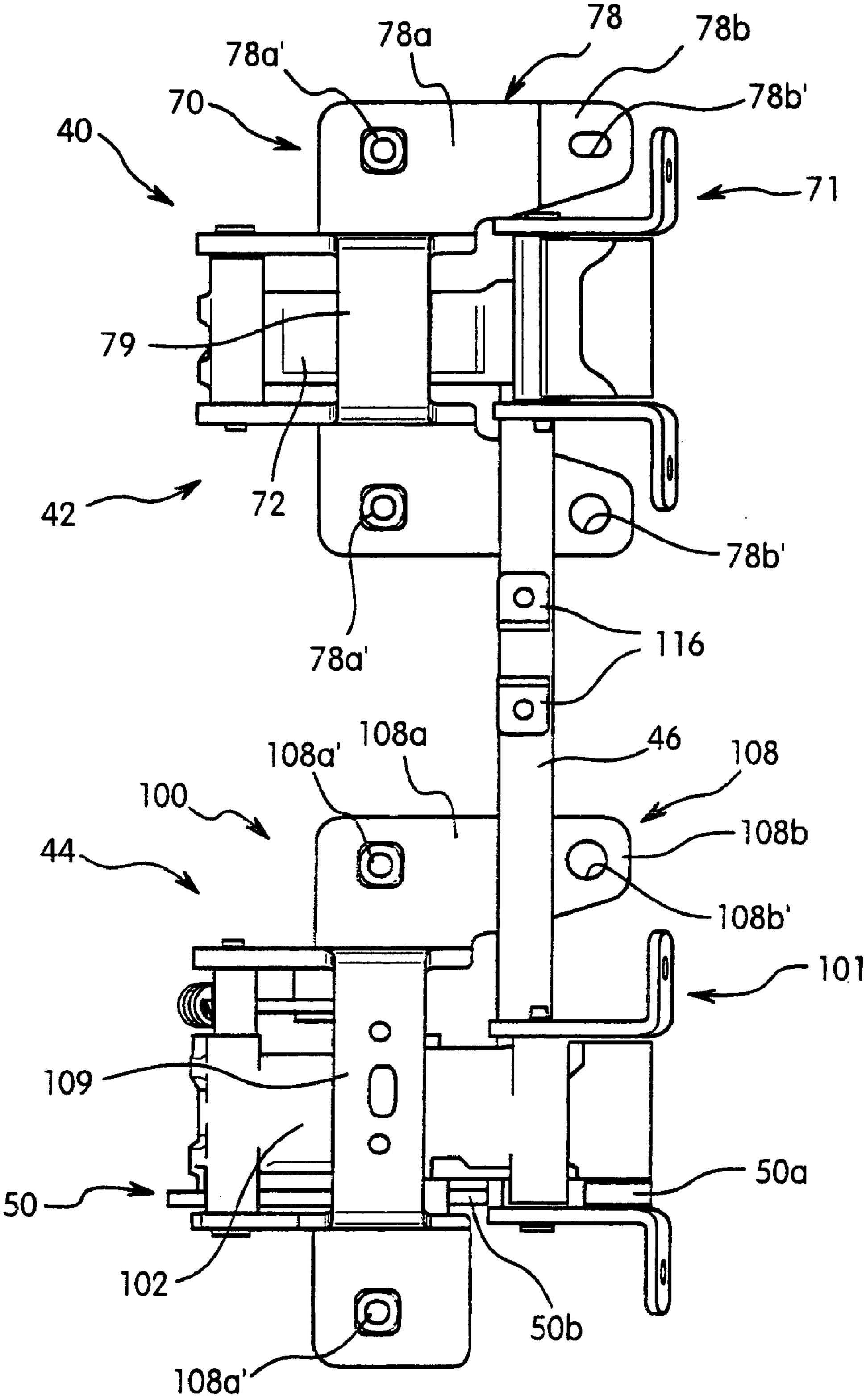
FIG. 13 is an exterior side elevational view of the rear door hinge assembly for the passenger's side rear door.
Figure 14:
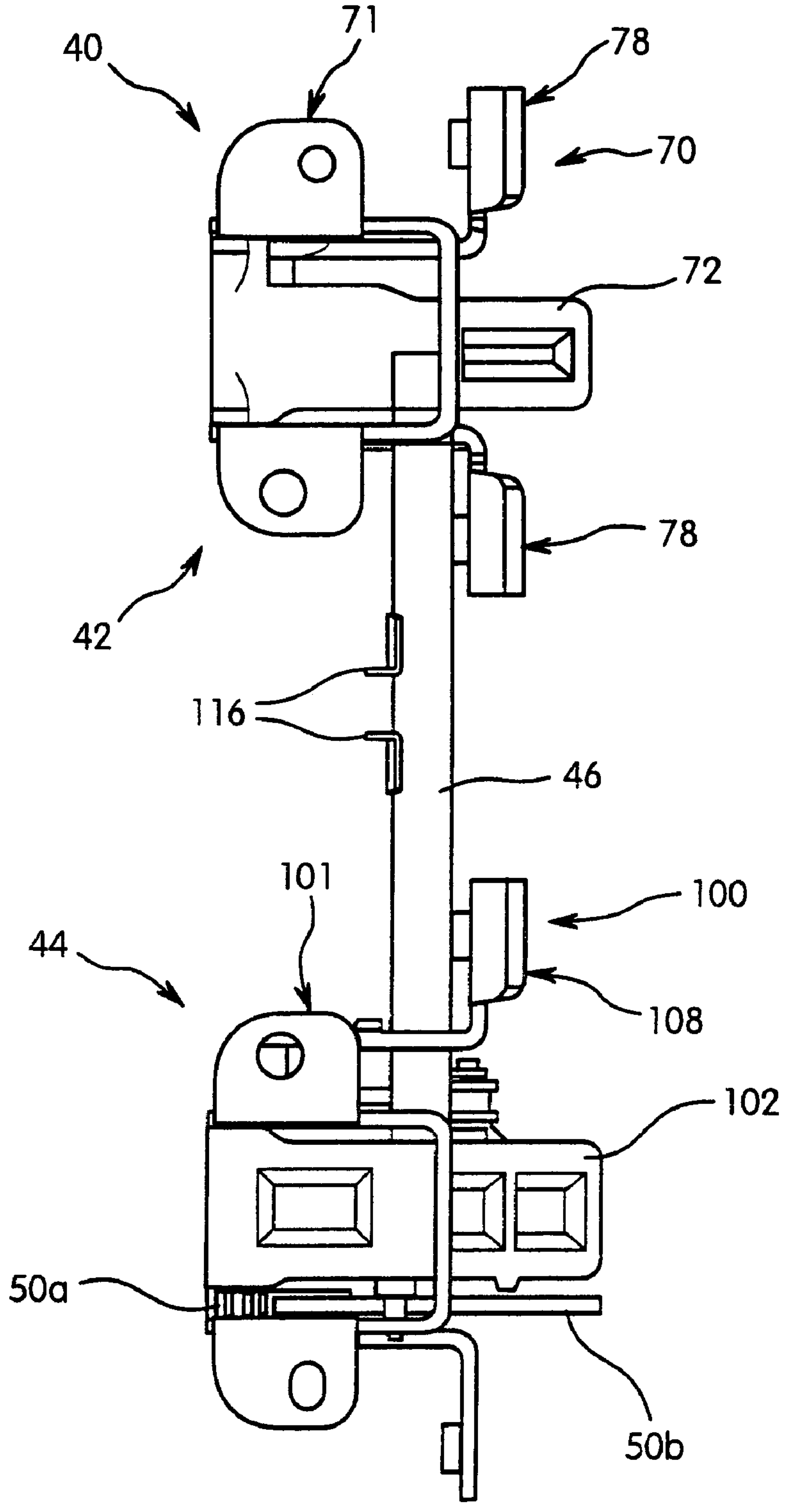
FIG. 14 is a front side elevational view of the rear door hinge assembly for the passenger's side rear door.
Figure 15:
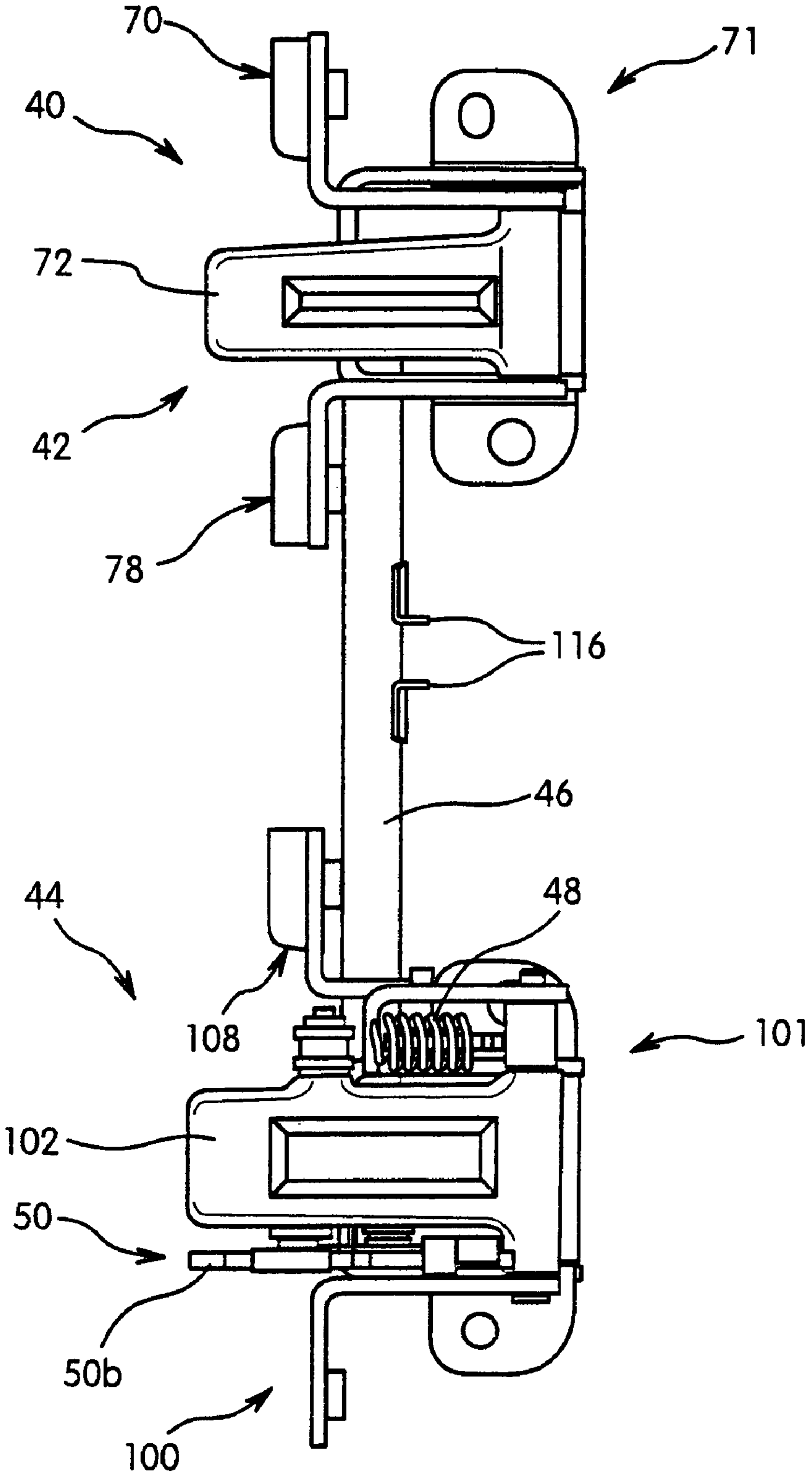
FIG. 15 is a rear side elevational view of the rear door hinge assembly for the passenger's side rear door.

As seen in FIGS. 11 and 12, the lower goose-neck connecting member 102 is preferably constructed of a one piece, unitary member that has a pair of tubular end portions for pivotally receiving the pivot pins 105 and 106 therein. The lower goose-neck connecting member 102 has the lower end of the torsion bar 46 fixedly coupled thereto at a point between the pivot pins 105 and 106. Preferably, the torsion bar 46 is fixedly coupled to the lower goose-neck connecting member 102 at a point such that the vertical axis of the torsion bar 46 always remains between an interior fastener mounting plane that contains the longitudinal axes of the interior bolts 53 and an exterior plane that contains the longitudinal axes of the exterior bolt 54. In other words, the interior fastening points of the lower hinge 44 are disposed rearwardly of the torsion bar 46 and the exterior fastening points of the lower hinge 44 are disposed forwardly of the torsion bar 46 in the open and closed positions.

The torsion bar 46 is preferably constructed of a hard rigid metallic material and is welded between the upper and lower goose-neck connecting member 72 and 102. The torsion bar 46 is preferably arranged such that its vertical axis is located between the longitudinal fastening axes of the interior bolts 51 and 53 that are disposed at the interior fastening points and the longitudinal fastening axes of the exterior bolts 52 and 54 disposed at the exterior fastening points as viewed along direction of the longitudinal fastening axis when the rear door 20 is in the open and closed positions. More preferably, the vertical axis of the torsion bar 46 always remains between the interior longitudinal fastening axis interior fasteners and the exterior longitudinal fastening axis of the exterior fasteners throughout the pivotal movement of the rear door 20 from its fully closed position to its fully opened position.

As seen in FIGS. 7–10, a wiring harness 112 is provided for supplying electrical power to electrical devices (e.g., electric locks, electric windows, speakers, seat belt retractors, etc) of the rear door 20 from the vehicle battery. Accordingly, the wiring harness 112 electrically couples various electrical devices of the rear door 20 to the electrical system of the vehicle 10. The wiring harness 112 is coupled to the torsion bar 46 by a ring fastening clip 114. The fastening clip 114 is preferably configured such that it can freely rotate about the vertical axis of the torsion bar 46. Thus, the wiring harness 112 moves in a generally horizontal direction with the torsion bar 46, but is restricted from substantial vertical movement relative to the torsion bar 46.

The torsion bar 46 has a pair of L-shaped stop members 116 fixed to a substantially center portion of the torsion bar 46 to form a U-shaped stop with the torsion bar 46. This stop members 116 act as upper and lower stops for limiting vertical movement of the wiring harness 114 that is fastened to the torsion bar 46 by the fastening clip 114. In particular, the fastening clip 114 is restrained from substantial longitudinal movement along the vertical axis of the torsion bar 46 by the L-shaped stop members 116. In other words, the wiring harness 112 can only move slightly up and down along the torsion bar 46 due to the stop members 116 contacting the fastening clip 114.

Figure 16:
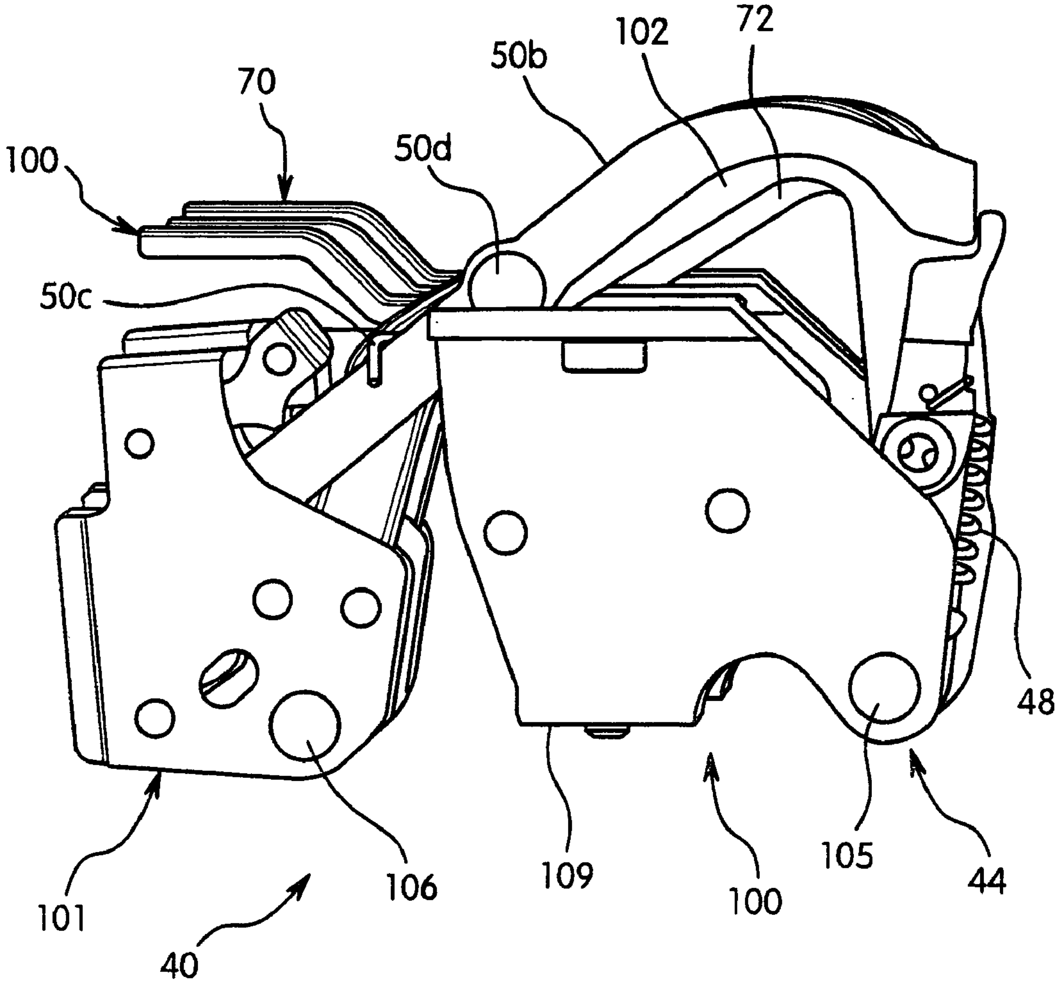
FIG. 16 is a bottom perspective view of the rear door hinge assembly for the passenger's side rear door.

As seen in FIGS. 12 and 16, the door latch mechanism 50 has a fixed latch member 50*a*, a movable latch member 50*b* and a torsion spring 50*c*. The fixed latch member 50*a* is fixedly attached to the lower door mounting member 101, while the movable latch member 50*b* pivotally attached to the lower goose-neck connecting member 102 by a pivot pin 50*d*. The torsion spring 50*c* has its coiled portion mounted on the pivot pin 50*d* with a first end of the torsion spring 50*c* engaging the movable latch member 50*b* and a second end of the torsion spring 50*c* engaging the lower goose-neck connecting member 102 to urge the movable latch member 50*b* into latching engagement with the fixed latch member 50. When the movable latch member 50*b* and the fixed latch member 50*a* are latched together, the lower door mounting member 101 is prevented from pivoting around the second pivot axis A2, until a pivoting force is applied to the door hinge assembly 40 that overcomes the force of the spring 50*c*. Thus, the door latch mechanism 50 is coupled to the lower hinge 44 to overrideably retain the rear door 20 in the first open position (90°) until a pivoting force is applied to the door hinge assembly 40 that overcomes the force of the spring 50*c*.

As seen in FIGS. 7–10, each of the cup shaped reinforcement members 34 preferably forms a contoured pocket or recess portion 34*a* with an annular flange 34*b* surrounding the contoured pocket portion 34*a*. Preferably, the cup shaped reinforcement members 34 are fixedly coupled to the vehicle interior side of the rear door pillar 24 along the inner side wall 30*a* and the exterior wall portion 32. In particular, the annular flange 34*b* overlies the inner side wall 30*a* and the exterior wall portion 32 and is welded to the inner side wall 30*a* and the exterior wall portion 32. The bolts 51–54 extend through openings formed in the annular flanges 34*a*. In other words, the annular flanges 34*b* are configured and arranged to overlie the interior and exterior fastening points. Thus, the cup shaped reinforcement members 34 reinforces the attachment of the door hinge assembly 40 to the rear door mounting pillar 24. Moreover, the contoured pocket portions 34*a* of the cup shaped reinforcement members 34 are configured and arranged to accommodate the movement of the goose-neck connecting member 72 and 102 as they pivot between the various door positions.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The terms that are expressed as "means-plus function" in the claims should include any structure that can be utilized to carry out the function of that part of the present invention. Also the terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle body structure comprising:

a vehicle body including a vertically extending door mounting pillar with a vehicle interior facing side and a vehicle exterior facing side, the door mounting pillar having an inner side wall disposed on the vehicle interior facing side, an outer side wall disposed on the vehicle exterior facing side, a pair of connecting end walls extending between the inner and outer side walls to define a hollow interior space, and an exterior wall portion disposed adjacent one of the connecting end walls in an area outside of the hollow interior space;

a door swingably mounted to the door mounting pillar of the vehicle body to move between a closed position and an open position; and a door hinge assembly mounted between the door mounting pillar and the door to swingably mount the door to the door mounting pillar for movement between the closed position and the open position, the door hinge assembly being fastened at interior fastening points on the inner side wall of the door mounting pillar and at exterior fastening points on the exterior wall portion of the door mounting pillar.

2. The vehicle body structure according to claim 1, wherein the door hinge assembly includes a double pivot pin arrangement having a first vertical pivot axis arranged to pivot the door from the closed position to a first open position as the door pivots about the first vertical pivot axis, and a second vertical pivot axis arranged to pivot the door from the first open position to a second open position as the door pivots about the second vertical pivot axis.

3. The vehicle body structure according to claim 2, wherein the first vertical pivot axis is arranged such that the door pivots about 90 degrees from the closed position to the first open position as the door pivots about the first vertical pivot axis, and the second vertical pivot axis is arranged such that the door pivots about 170 degrees from the first open position to the second open position.

4. The vehicle body structure according to claim 1, wherein the door hinge assembly includes a pillar mounting member mounted to the door mounting pillar, a door mounting member mounted to the door, and a connecting member pivotally mounted at a first end to the pillar mounting member and a second end pivotally mounted to the door mounting member such that the connecting member moves between a retracted position and an extended position, a majority of the connecting member being disposed within the hollow interior space of the door mounting pillar when in the retracted position and a majority of the connecting member being disposed outside of the hollow interior space of the door mounting pillar when in the extended position.

5. The vehicle body structure according to claim 1, wherein the door hinge assembly includes a plurality of fasteners coupling the door hinge assembly to the door mounting pillar at the interior and exterior fastening points, the fasteners having longitudinal fastening axes that extend in a substantially orthogonal direction to the vehicle interior and exterior facing sides of the door mounting pillar.

6. The vehicle body structure according to claim 1, wherein the door mounting pillar further includes a contoured pocket located on the inner side wall, the contoured pocket being recessed inwardly from the interior fastening points towards an interior area of the vehicle body to receive a swinging portion of the door hinge assembly when the door is in the closed position.

7. The vehicle body structure according to claim 6, wherein the contoured pocket is a cup shaped reinforcement member having at least parts overlying the interior and exterior fastening points.

8. The vehicle body structure according to claim 1, wherein the door hinge assembly includes an upper hinge, a lower hinge, and a torsion bar extending substantially vertically between the upper and lower hinges.

9. The vehicle body structure according to claim 8, wherein the door hinge assembly further includes a plurality of fasteners coupling the upper and lower hinges to the door mounting pillar at the interior and exterior fastening points, the fasteners having longitudinal fastening axes that extend in a substantially orthogonal direction to the vehicle interior and exterior facing sides of the door mounting pillar, and the torsion bar being located between the longitudinal fastening axes of the fasteners disposed at the interior fastening points and the longitudinal fastening axes of the fasteners disposed at the exterior fastening points as viewed along the direction of the longitudinal fastening axes when the door is in the open and closed positions.

10. The vehicle body structure according to claim 8, wherein the upper and lower hinges are arranged and configured to form a double pivot pin arrangement having a first vertical pivot axis arranged to pivot the door from the closed position to a first open position as the door pivots about the first vertical pivot axis, and a second vertical pivot axis arranged to pivot the door from the first open position to a second open position as the door pivots about the second vertical pivot axis.

11. The vehicle body structure according to claim 10, wherein the first vertical pivot axis is arranged such that the door pivots about 90 degrees from the closed position to the first open position as the door pivots about the first vertical pivot axis, and the second vertical pivot axis is arranged such that the door pivots about 170 degrees from the first open position to the second open position.

12. The vehicle body structure according to claim 9, wherein the door mounting pillar further includes upper and lower contoured pockets located on the inner side wall, the upper and lower contoured pockets being recessed inwardly from the interior fastening points towards an interior area of the vehicle body to receive upper and lower swinging portions of the upper and lower hinges, respectively, when the door is in the closed position.

13. The vehicle body structure according to claim 12, wherein the upper and lower contoured pockets are cup shaped reinforcement members having at least parts overlying the interior and exterior fastening points.

14. The vehicle body structure according to claim 8, further comprising an electrical device mounted in the door; and a wiring harness extending between the electrical device mounted in the door and the door mounting pillar with an intermediate portion of the wiring harness coupled to the torsion bar.

15. The vehicle body structure according to claim 14, wherein the wiring harness is coupled to the torsion bar by a coupling member that is configured and arranged such that the wiring harness moves relative to the coupling member when the door is moved between the closed and open positions.

16. The vehicle body structure according to claim 15, wherein the coupling member is coupled to the torsion bar so as to be constrained from substantial vertical movement along the torsion bar.

17. The vehicle body structure according to claim 1, wherein the door hinge assembly includes an upper hinge having an upper pillar mounting member mounted to the door mounting pillar, an upper door mounting member mounted to the door, and an upper goose-neck connecting member pivotally mounted at a first end to the upper pillar mounting member for pivoting about a first vertical pivot axis and a second end pivotally mounted to the upper door mounting member for pivoting about a second vertical pivot axis, and a lower hinge having a lower pillar mounting member mounted to the door mounting pillar, a lower door mounting member mounted to the door, and a lower goose-neck connecting member pivotally mounted at a first end to the lower pillar mounting member for pivoting about the first vertical pivot axis and a second end pivotally mounted to the lower door mounting member for pivoting about the second vertical pivot axis, and a torsion bar extending substantially vertically between the upper and lower goose-neck connecting members.

18. The vehicle body structure according to claim 17, wherein the upper and lower pillar mounting members are fastened to the door mounting pillar at first and second fastening points with the first fastening points being disposed rearwardly of the torsion bar and the second fastening points are disposed forwardly of the torsion bar at least when the door is in the closed and open positions.

19. The vehicle body structure according to claim 17, wherein the first vertical pivot axis is arranged such that the door pivots about 90 degrees from the closed position to a first open position as the door pivots about the first vertical pivot axis, and the second vertical pivot axis is arranged such that the door pivots about 170 degrees from the first open position to a second open position.

20. The vehicle body structure according to claim 17, wherein the upper and lower goose-neck connecting members are configured and arranged to move between a retracted position and an extended position, a majority of the upper and lower goose-neck connecting members being disposed within the hollow interior space of the door mounting pillar when in the retracted position and a majority of the upper and lower goose-neck connecting members being disposed outside of the hollow interior space of the door mounting pillar when in the extended position.

21. The vehicle body structure according to claim 17, wherein the door hinge assembly includes a plurality of fasteners coupling the door hinge assembly to the door mounting pillar at the interior and exterior fastening points, the fasteners having longitudinal fastening axes that extend in a substantially orthogonal direction to the vehicle interior and exterior facing sides of the door mounting pillar.

22. The vehicle body structure according to claim 21, wherein the door mounting pillar further includes upper and lower contoured pockets located on the inner side wall, the upper and lower contoured pockets being recessed inwardly from the interior fastening points towards an interior area of the vehicle body to receive the upper and lower goose-neck connecting members, respectively, when the door is in the closed position.

23. The vehicle body structure according to claim 22, wherein the upper and lower contoured pockets are cup shaped reinforcement members having at least parts overlying the interior and exterior fastening points.

* * * * *